United States Patent
Porter et al.

(10) Patent No.: US 11,726,321 B2
(45) Date of Patent: Aug. 15, 2023

(54) IMAGE SHIFT CORRECTION FOR BINOCULAR VIRTUAL IMAGING APPARATUS

(71) Applicant: Vuzix Corporation, West Henrietta, NY (US)

(72) Inventors: Tyler W. Porter, Honeoye Falls, NY (US); Robert J. Schultz, Victor, NY (US); Robert W. Gray, Rochester, NY (US)

(73) Assignee: Vuzix Corporation, West Henrietta, NY (US)

( * ) Notice: Subject to any disclaimer, the term of this patent is extended or adjusted under 35 U.S.C. 154(b) by 0 days.

(21) Appl. No.: 16/632,158

(22) PCT Filed: Jul. 17, 2018

(86) PCT No.: PCT/US2018/042487
§ 371 (c)(1),
(2) Date: Jan. 17, 2020

(87) PCT Pub. No.: WO2019/018396
PCT Pub. Date: Jan. 24, 2019

(65) Prior Publication Data
US 2020/0233213 A1    Jul. 23, 2020

Related U.S. Application Data

(60) Provisional application No. 62/533,489, filed on Jul. 17, 2017.

(51) Int. Cl.
*G02B 27/01*   (2006.01)
*G02B 30/56*   (2020.01)
*G02B 27/00*   (2006.01)

(52) U.S. Cl.
CPC ..... *G02B 27/0101* (2013.01); *G02B 27/0176* (2013.01); *G02B 2027/0134* (2013.01);
(Continued)

(58) Field of Classification Search
CPC ....... A61B 3/032; A61B 3/103; A61B 3/1015; A61B 3/14; A61B 3/113; A61B 3/1208;
(Continued)

(56) References Cited

U.S. PATENT DOCUMENTS 5,900,909 A    5/1999  Parulski et al.
9,529,196 B1*  12/2016 Sade .................. G02B 17/086
(Continued)

FOREIGN PATENT DOCUMENTS

JP    2004145367 A    5/2004
JP    2009244603 A    10/2009
(Continued)

OTHER PUBLICATIONS

Japanese Patent Office, Office Action (Notice of reasons for Rejection) in Japanese Patent Application No. 2020-500076, dated Feb. 9, 2021.
(Continued)

*Primary Examiner* — Dawayne Pinkney
(74) *Attorney, Agent, or Firm* — Harter Secrest & Emery LLP; Jacob D. Merrill, Esq.

(57) ABSTRACT

An imaging apparatus for stereoscopic viewing has a frame that seats against the head of a viewer. A left-eye imaging apparatus and a right-eye imaging apparatus are supported by the frame. The frame is reshapeable in a manner that changes a relative alignment of the left-eye imaging apparatus and the right-eye imaging apparatus to accommodate different viewer head anatomies. An adjustment mechanism responsive to the reshaping of the frame restores relative alignment of the left-eye imaging apparatus and the right-
(Continued)

eye imaging apparatus for conveying stereoscopic virtual images to the viewer.

27 Claims, 15 Drawing Sheets

(52) U.S. Cl.
CPC ............... *G02B 2027/0158* (2013.01); *G02B 2027/0178* (2013.01)

(58) Field of Classification Search
CPC .. A61B 3/1225; A61B 3/024; G02B 27/0172; G02B 27/0025; G02B 27/0093; G02B 27/0176; G02B 27/0126; G02B 27/283; G02B 2027/011; G02B 2027/015; G02B 2027/0178; G02B 2027/0187; G02F 1/163; G02F 3/011; G02F 3/012; G02F 3/013; G02F 3/017; G02F 3/03545
USPC ................. 359/630–634, 13–14; 310/49 R, 310/156.32–156.35, 266–268, 156.02; 353/11–12, 28, 119; 345/7, 9; 340/438, 340/980, 995.1, 815.47, 815.74; 351/200, 351/205–206, 210, 221
See application file for complete search history.

(56) References Cited

U.S. PATENT DOCUMENTS

| | | | |
|---|---|---|---|
| 2013/0038510 A1* | 2/2013 | Brin ..................... | G02B 27/017 345/8 |
| 2013/0100397 A1 | 4/2013 | Farnam | |
| 2014/0062841 A1 | 3/2014 | Ishikawa et al. | |
| 2015/0219902 A1* | 8/2015 | Kim .................. | G02B 27/0179 345/8 |
| 2016/0117864 A1 | 4/2016 | Cajigas et al. | |
| 2016/0171675 A1 | 6/2016 | Tseng et al. | |
| 2017/0295362 A1* | 10/2017 | Travis ................. | H04N 13/128 |
| 2018/0364488 A1 | 12/2018 | Mori et al. | |
| 2019/0004325 A1* | 1/2019 | Connor .............. | G02B 27/0172 |
| 2019/0068944 A1* | 2/2019 | Zhang ...................... | G02B 7/12 |
| 2019/0129182 A1* | 5/2019 | Hu ....................... | G02B 6/0035 |

FOREIGN PATENT DOCUMENTS

| | | |
|---|---|---|
| JP | 2017026689 A | 2/2017 |
| WO | 20160112130 A1 | 7/2016 |
| WO | 20170115505 A1 | 7/2017 |
| WO | 20170120346 A1 | 7/2017 |

OTHER PUBLICATIONS

European Patent Office, Extended European Search Report in European patent application No. 21154541.3, dated May 14, 2021.
European Patent Office, Office Action (Rule 62a(1) EPC) in European Patent Application No. 18835796.6, dated Oct. 22, 2020.
European Patent Office, Extended European Search Report in European patent application No. 18835796.6, dated Feb. 5, 2021.
Patent Cooperation Treaty, IPRP in PCT/US2018/042487, dated Jan. 30, 2020.
IEEE, Younbaek Lee et al., A Flexible Exoskeleton for Hip Assistance, p. 1058-1063, 2017 Sep. 24-28, 2017 IEEE/RSJ International Conference on Intelligent Robots and Systems (IROS).

* cited by examiner

IMAGE SHIFT CORRECTION FOR BINOCULAR VIRTUAL IMAGING APPARATUS

TECHNICAL FIELD

This disclosure generally relates to paired electronic displays worn by a viewer for forming left-eye and right-eye virtual images and more particularly relates to binocular near-eye displays within adjustable head-mountable frames.

BACKGROUND

Head-Mounted Displays (HMDs) have been developed for a range of diverse uses, including military, commercial, industrial, fire-fighting, and entertainment applications. For many of these applications, there is value in forming a virtual image that can be visually superimposed over the real-world image that lies in the field of view of the HMD user.

For stereoscopic imaging, virtual image content is generated and displayed for the left and right eyes of the viewer. To provide a stereoscopic image, separate left and right-eye images are formed providing slightly different perspectives of the image content and thereby lending an illusion of depth and volume to the displayed stereoscopic virtual image. Although providing images from slightly different perspectives, the left- and right-eye images are aligned with each other, so that the two images can be combined in the viewer's brain to give the perception of 3D depth.

To accommodate a viewer population having a range of head sizes, the frames of the HMD designs can be made adjustable. However, such adjustments can disturb the alignment of the left- and right-eye images generated by the binocular near-eye displays mounted in the frames. Adjustments to the frame for improving viewer comfort and fit can reduce image quality or increase eye strain.

One conventional approach specially adapts HMDs to individual users by providing a stiff frame that allows adjustable mounting of display elements over a range of positions. A separate alignment procedure can then be used for each viewer, identifying suitable positioning of components for alignment of left- and right-eye images and mechanically fixing this positioning. This approach, however, does not adapt the frame for comfortably mounting on a viewer's head or allow a viewer to readily share a head-mounted display with another viewer, since the individual adjustments may not be well-suited to another viewer's visual anatomy.

SUMMARY

It is an object of the present disclosure to advance the art of stereoscopic virtual image presentation when using compact head-mounted devices and similar imaging apparatus. Advantageously, embodiments of the present disclosure feature stereoscopic imaging apparatus with adjustable frames to compensate for different viewer head dimensions and with relatively adjustable near-eye displays that preserve optical alignments required for presenting stereoscopic images over a range of such frame adjustments.

These and other aspects, objects, features and advantages of the disclosed embodiments will be more clearly understood and appreciated from a review of the following detailed description of the preferred embodiments and appended claims, and by reference to the accompanying drawings.

According to an aspect of the present disclosure, there is provided an imaging apparatus for stereoscopic viewing including a frame arranged to seat against the head of a viewer, a left-eye imaging apparatus supported by the frame, and a right-eye imaging apparatus supported by the frame, wherein the left-eye imaging apparatus and the right-eye imaging apparatus are relatively alignable to convey stereoscopic virtual images to the viewer. The frame is reshapeable in a manner that changes a relative alignment of the left-eye imaging apparatus and the right-eye imaging apparatus to accommodate different viewer head anatomies. An adjustment mechanism responsive to the reshaping of the frame restores relative alignment of the left-eye imaging apparatus and the right-eye imaging apparatus for conveying stereoscopic virtual images to the viewer.

Preferably, the imaging apparatus further comprising at least one sensor coupled to the frame and disposed to provide an output signal associated with the reshaping of the frame and indicative of the changes the relative alignment of the left- and right-eye imaging apparatus. The adjustment mechanism preferably includes an actuator responsive to the output signal of the at least one sensor to adjust a relative angular disposition of one or more components of the left- and right-eye imaging apparatus.

The at least one sensor can be arranged to measure flexure at a nose bridge of the frame or at one or both temples of the frame. Each of the left-eye imaging apparatus and the right-eye imaging apparatus can include a waveguide that conveys the virtual image to the corresponding left and right eye of the viewer. The actuator can be arranged to adjust a relative angular disposition of the waveguide of at least one of the left-eye imaging apparatus and the right-eye imaging apparatus. Each of the left-eye imaging apparatus and the right-eye imaging apparatus can also include a projector, and the actuator can be arranged to adjust a relative angular disposition of the projector with respect to the waveguide of at least one of the left-eye imaging apparatus and the right-eye imaging apparatus.

The imaging apparatus can also include at least one image generator, and the adjustment mechanism relatively shifts left-eye image content and right-eye image content produced by the image generator in response to the output signal of the least one sensor signal.

According to another aspect of the present disclosure, there is provided an imaging apparatus for stereoscopic viewing including a flexible frame that seats against the head of a viewer and a left-eye imaging apparatus and a right-eye imaging apparatus that are relatively aligned to convey stereoscopic virtual images to the viewer. The left-eye imaging apparatus and the right-eye imaging apparatus are rigidly coupled to each other within the frame. The left-eye imaging apparatus and the right-eye imaging apparatus remain relatively aligned to convey stereoscopic virtual images to the viewer when the flexible frame is bent into a different shape to better fit a head size of the viewer.

The flexible frame can include a flexible nose bridge located between the left-eye imaging apparatus and the right-eye imaging apparatus, and the left-eye imaging apparatus and the right-eye imaging apparatus remain relatively aligned to convey stereoscopic virtual images to the viewer when the flexible nose bridge is bent into a different shape to better fit a head size of the viewer. The left-eye imaging apparatus and the right-eye imaging apparatus can be connected to the frame through a pin in the flexible nose bridge. The flexible frame can include cavities within which the left-eye imaging apparatus and the right-eye imaging apparatus are relatively movable with respect to the frame.

Another aspect of the invention includes a near-eye binocular imaging system including at least one image generator for generating images, a frame arranged to seat against the head of a viewer, a left-eye imaging apparatus supported by the frame for converting at least some of the generated images into virtual images viewable by a left eye the viewer, and a right-eye imaging apparatus supported by the frame for converting at least some of the generated images into virtual images viewable by a right eye the viewer. The left-eye imaging apparatus and the right-eye imaging apparatus are relatively oriented for relatively aligning the virtual images viewable by the left and right eyes of the viewer to convey stereoscopic virtual images to the viewer. The frame is reshapeable in a manner that changes the relative orientation of the left-eye imaging apparatus and the right-eye imaging apparatus to accommodate different viewer head anatomies while correspondingly misaligning the virtual images viewable by the left and right eyes of the viewer. A sensor supported by the frame detects and outputs an indication of the change in the relative orientation of the left-eye imaging apparatus and the right-eye imaging apparatus. A processor associated with the at least one image generator receives the output from the sensor, determines an amount of adjustment to compensate for the changes the relative orientation of the left-eye imaging apparatus and the right-eye imaging apparatus, and provides for shifting the images that are generated by the at least one image generator for restoring of the relative alignment of the virtual images viewable by the left and right eyes of the viewer to convey stereoscopic virtual images to the viewer.

The left-eye imaging apparatus together with a first of the at least one image generator can comprise a first projector and a first waveguide supported by the frame. The first projector incorporates the first image generator and provides for projecting images generated by the first image generator as virtual images into the first waveguide, and the first waveguide provides for conveying the virtual images to the viewer's left eye. The right-eye imaging apparatus together with a second of the at least one image generator can comprise a second projector and a second waveguide supported by the frame. The second projector incorporates the second image generator and provides for projecting images generated by the second image generator as virtual images into the second waveguide, and the second waveguide provides for conveying the virtual images to the viewer's right eye. The processor can provide for shifting the images generated by at least one of the first and second image generators for conveying stereoscopic virtual images to the viewer. Alternatively, the processor can provide for shifting the images generated by both the first and second image generators for conveying stereoscopic virtual images to the viewer.

The frame can be subject to flexure for accommodating different viewer head anatomies, and the sensor can provide for measuring the flexure of the frame. The sensor can include at least one of a camera and a distance sensor mounted on the frame for measuring the flexure of the frame. The frame can include both a frame front supporting the first and second waveguides and temples supporting the first and second projectors. In addition, the frame front can include a nose-piece section between the first and second waveguides, and the sensor can be arranged to detect flexure of the nose-piece section. Alternatively, the sensor can be one of at least two sensors for detecting changes in the orientation of the temples with respect to the frame front.

Another aspect as a method accommodates flexure of a frame that supports a left-eye imaging apparatus and a right-eye imaging apparatus within which images generate by an image generator are converted into virtual images that are viewable by the left and right eyes of a viewer. The left-eye imaging apparatus and the right-eye imaging apparatus are relatively orienting for relatively aligning the virtual images viewable by the left and right eyes of the viewer to convey stereoscopic virtual images to the viewer. The frame is reshaped in a manner that changes a relative orientation of the left-eye imaging apparatus and the right-eye imaging apparatus to accommodate different viewer head anatomies while correspondingly misaligning the virtual images viewable by the left and right eyes of the viewer. The reshaping of the frame is sensed as an indication of the change in the relative orientation of the left-eye imaging apparatus and the right-eye imaging apparatus. An amount of adjustment to compensate for the changes the relative orientation of the left-eye imaging apparatus and the right-eye imaging apparatus is determined from the sensed reshaping of the frame. The images that are generated by the at least one image generator are shifted in accordance with the determined amount of adjustment for restoring of the relative alignment of the virtual images viewable by the left and right eyes of the viewer for conveying stereoscopic virtual images to the viewer.

The reshaping of the frame can include bending a nose-piece portion of the frame between the left-eye and right-eye imaging apparatus and the referenced sensing can detect the bending of the nose-piece section. The at least one image generator can include a first image generator for generating images for the left-eye imaging apparatus and a second image generator for generating images for the right-eye imaging apparatus. The referenced shifting can include shifting the images generated by the first and second image generators in opposite directions for conveying stereoscopic virtual images to the viewer.

BRIEF DESCRIPTION OF THE DRAWING FIGURES

Figure 2B:
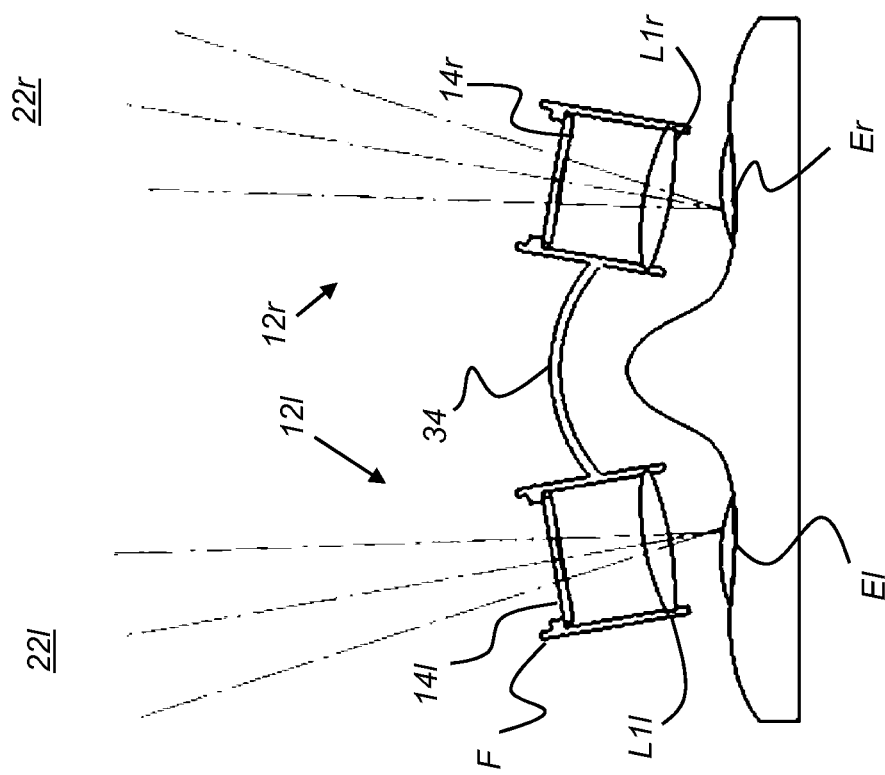
Figure 2A:
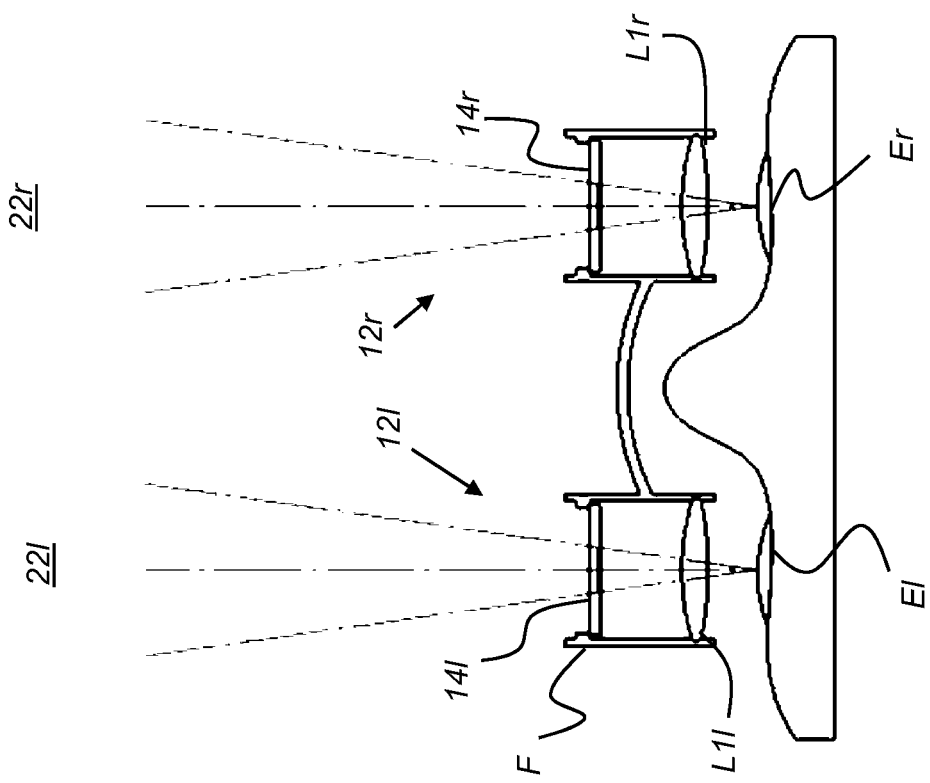
Figure 2C:
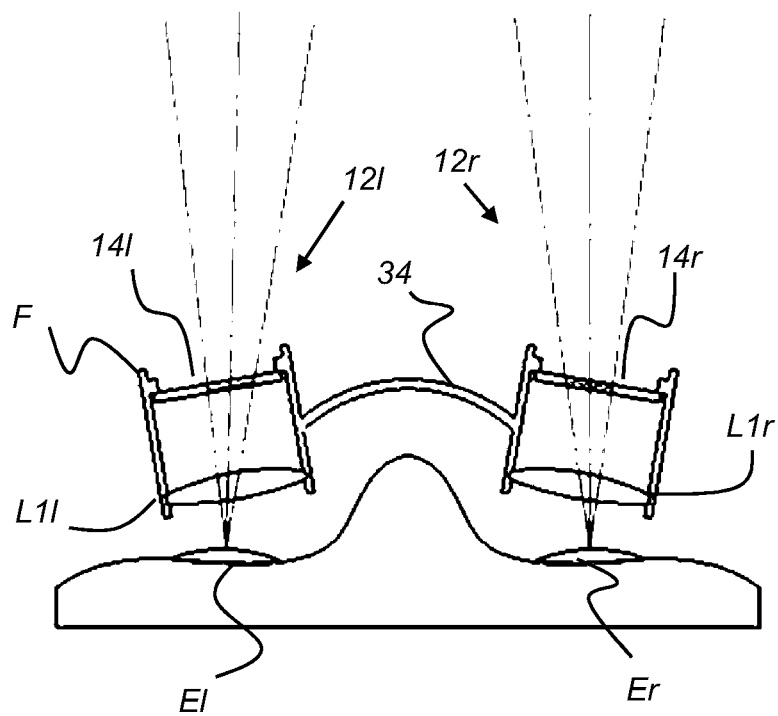

FIGS. 2A, 2B, and 2C are top views of a HMD in a schematic form including imaging components in different orientations and relative effects on the orientations of left- and right-eye virtual images.

Figure 3A:
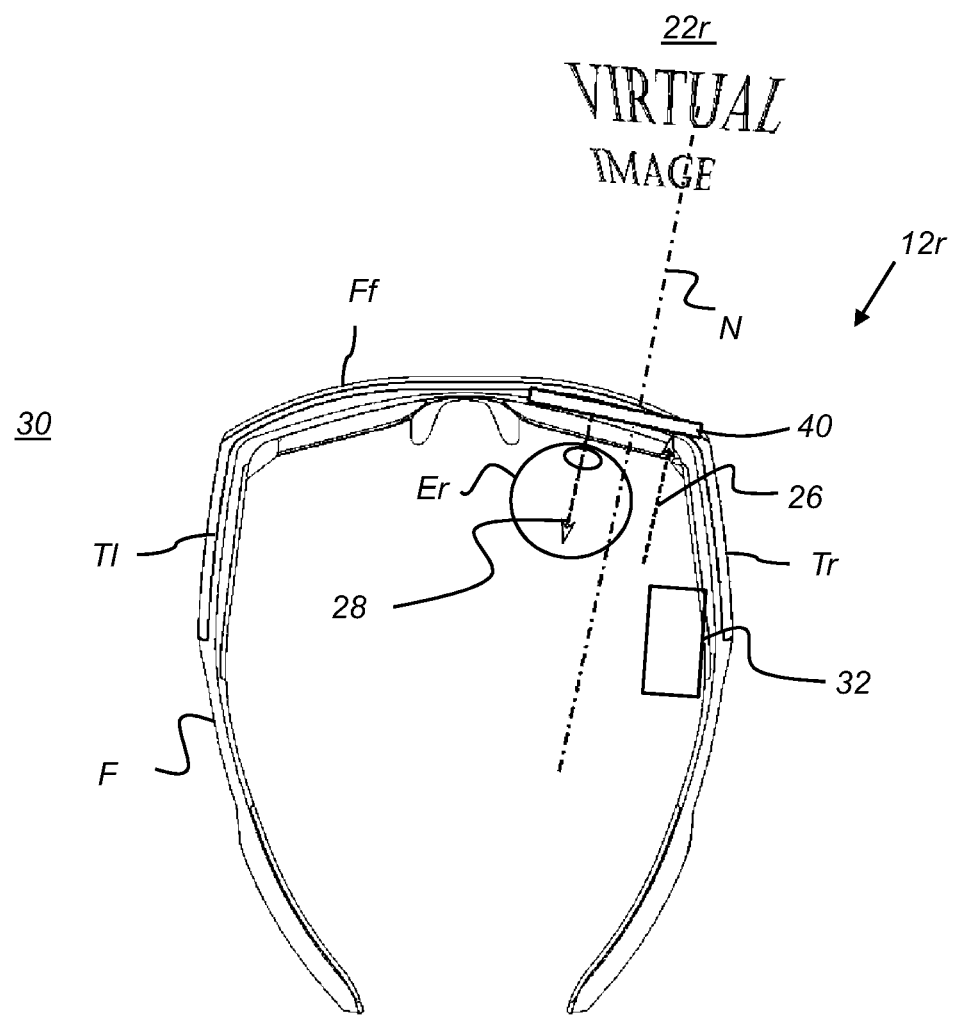
Figure 3B:
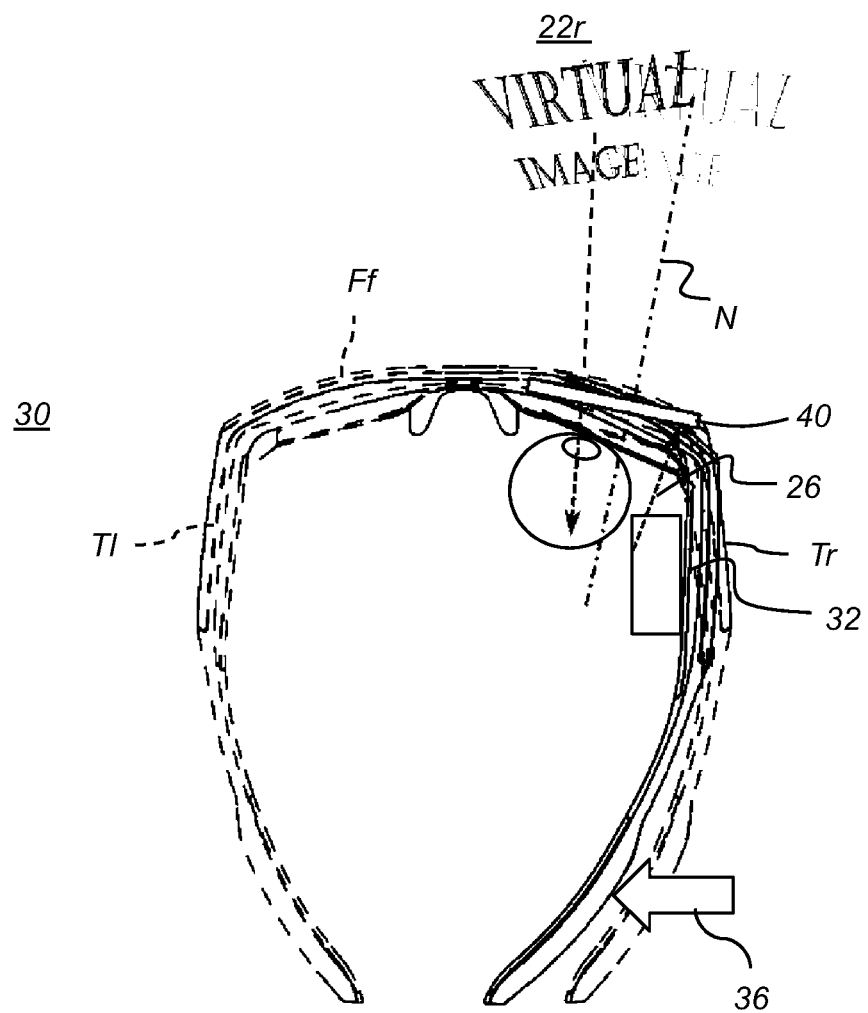
Figure 3C:
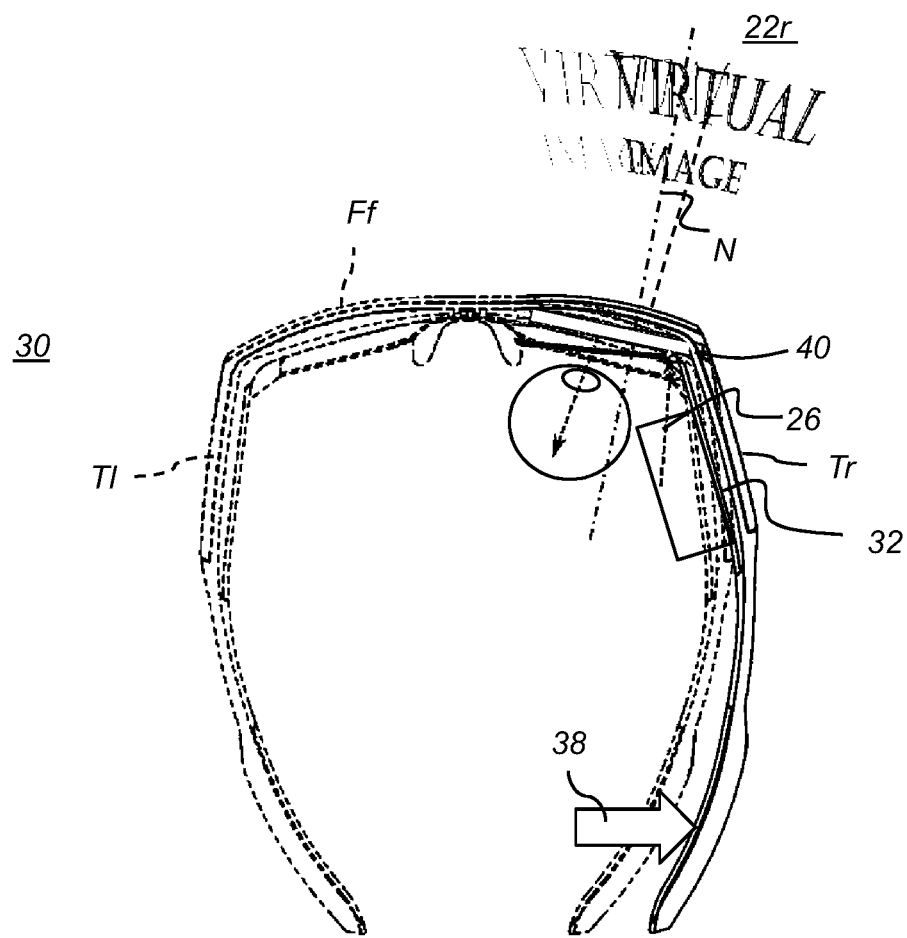

FIGS. 3A, 3B, and 3C are top views of a HMD having waveguide type imaging components and an eyeglass frame subject to flexure resulting in different orientations of left- and right-eye virtual images.

Figure 4A:
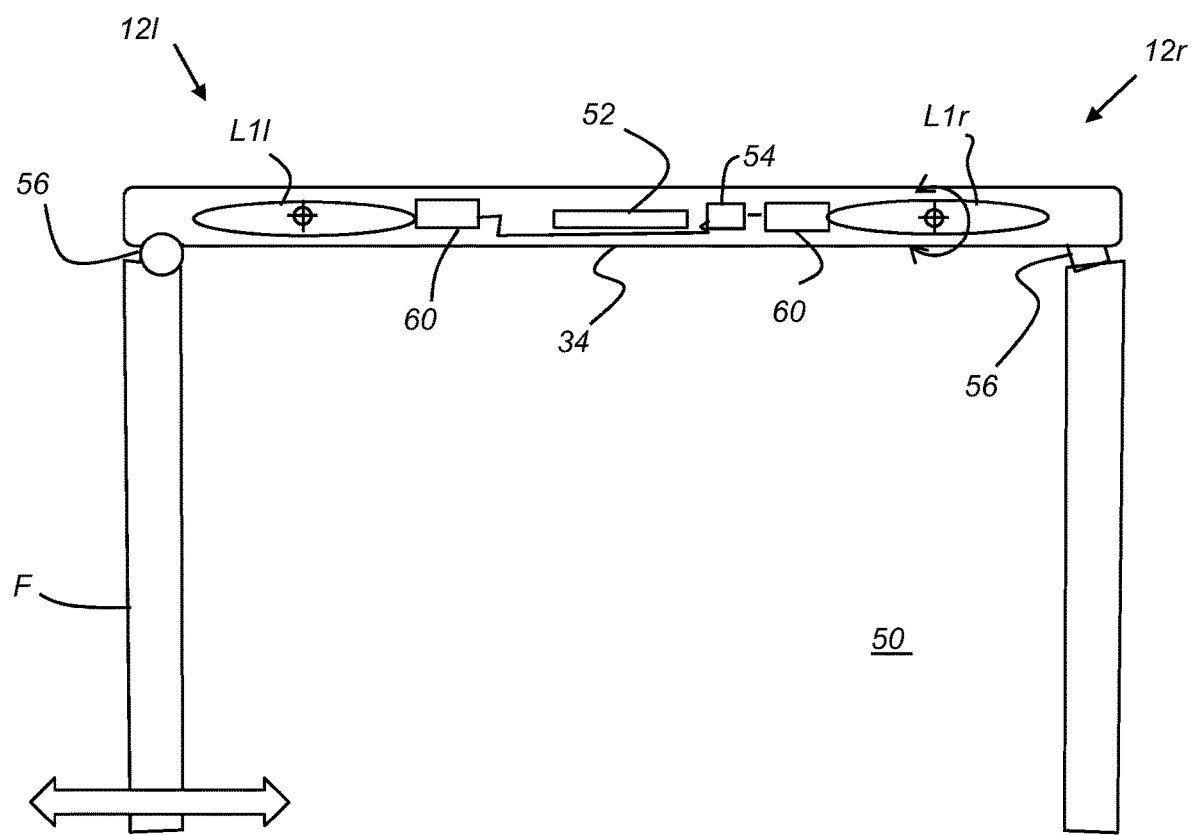

FIG. 4A is a top sectional view of a HMD with adjustable imaging components within a flexible frame.

Figure 4B:
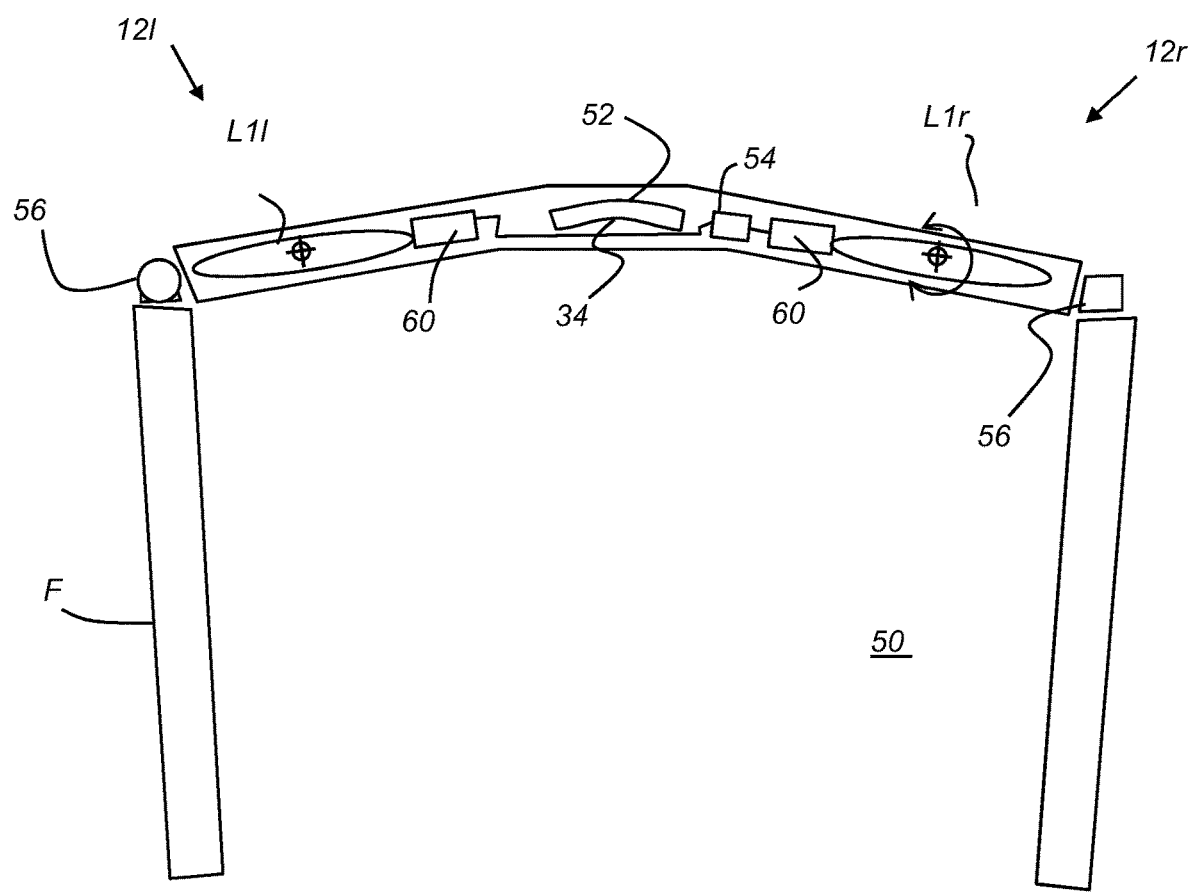

FIG. 4B is a top sectional view of the HMD of FIG. 4A showing the frame in a flexed position.

Figure 5:
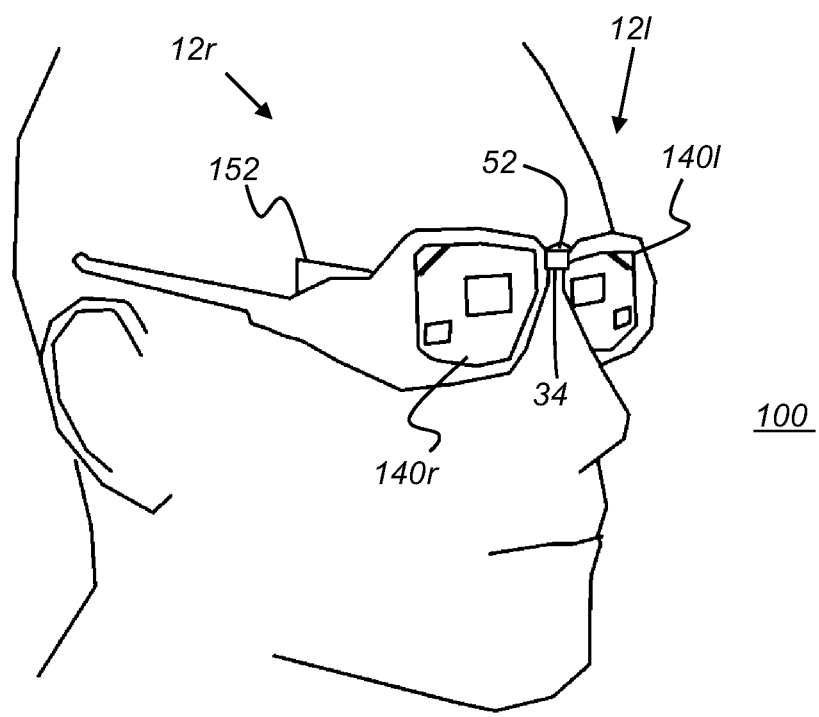

FIG. 5 is a perspective view of a HMD for stereoscopic augmented reality viewing using aspects of the present disclosure.

Figure 6A:
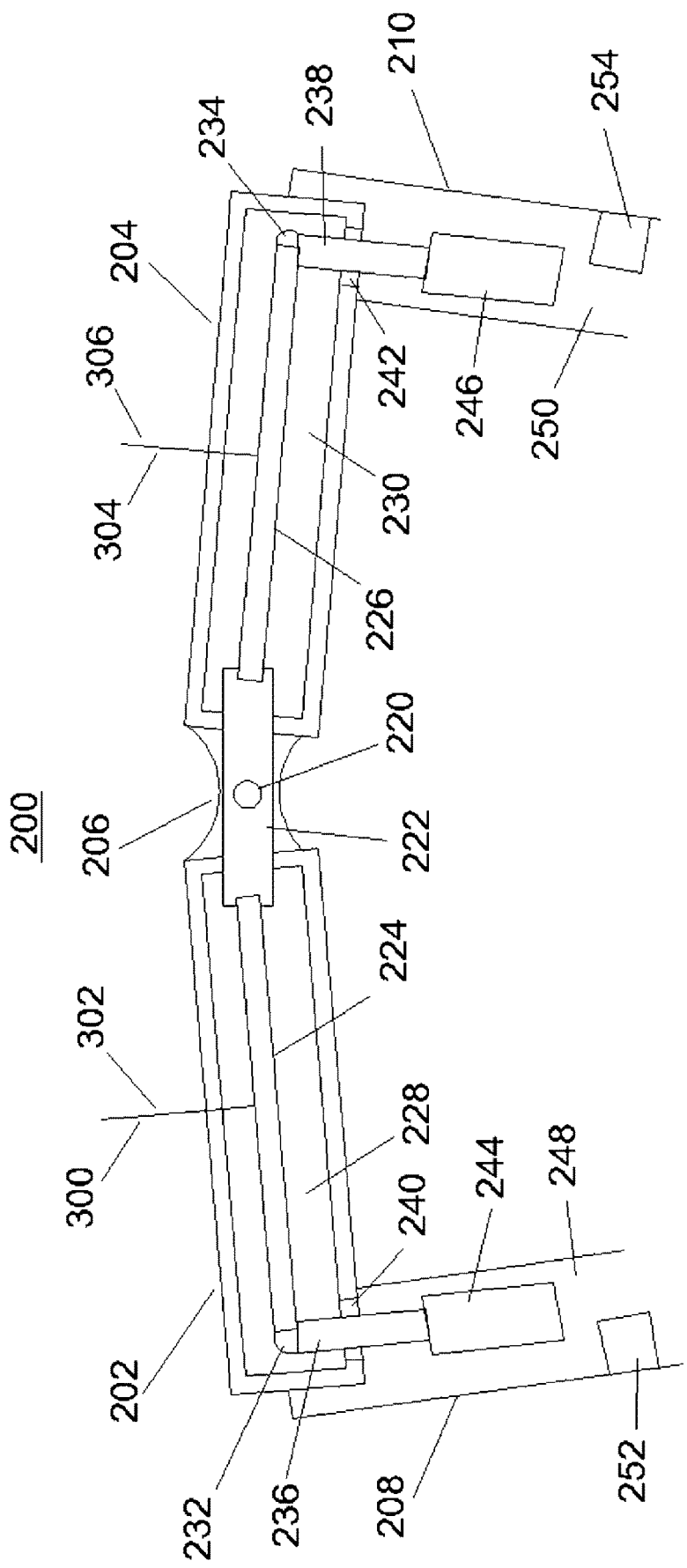

FIG. 6A is a top, cut-away view of a flexible frame and embedded imaging system.

Figure 6B:
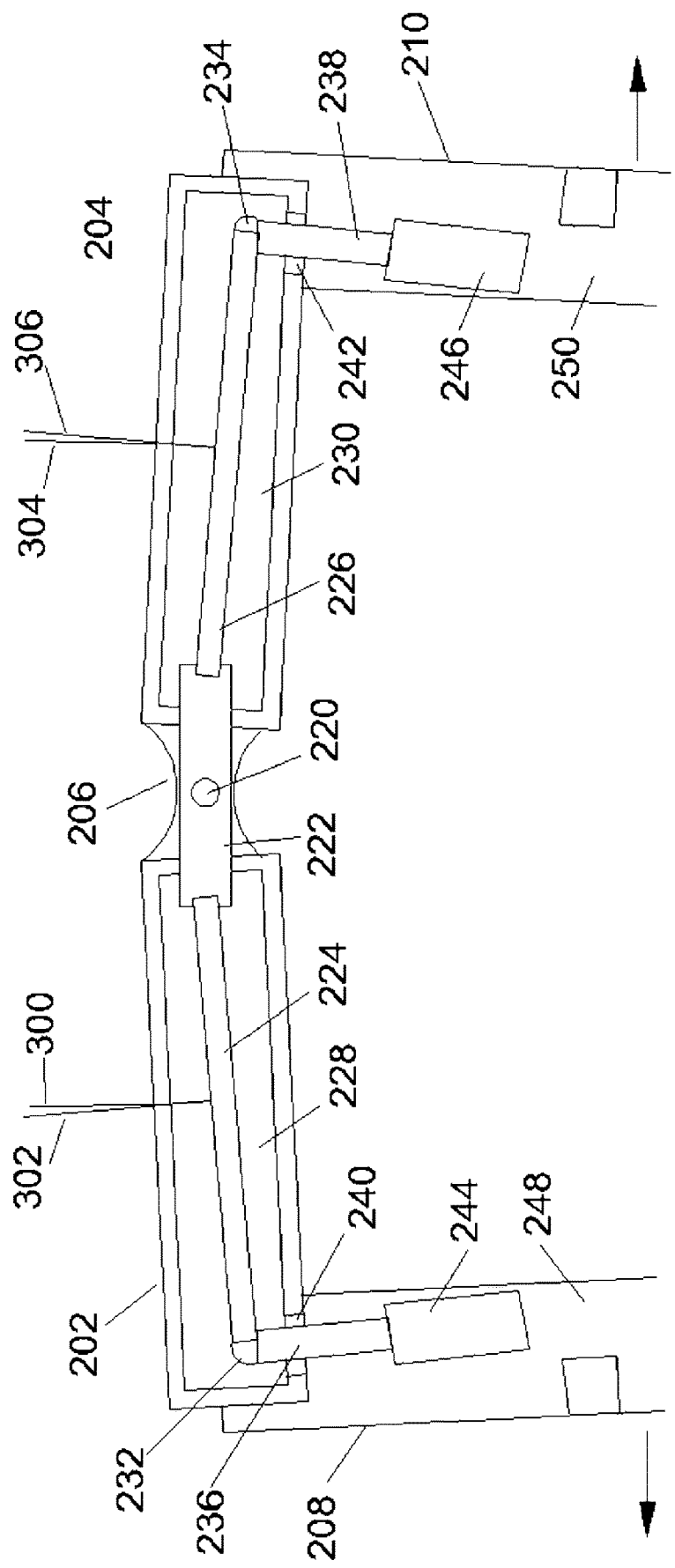

FIG. 6B is a top, cut-away view of the flexible frame and embedded imaging system of FIG. 6A where the frame has been bent.

Figure 7:
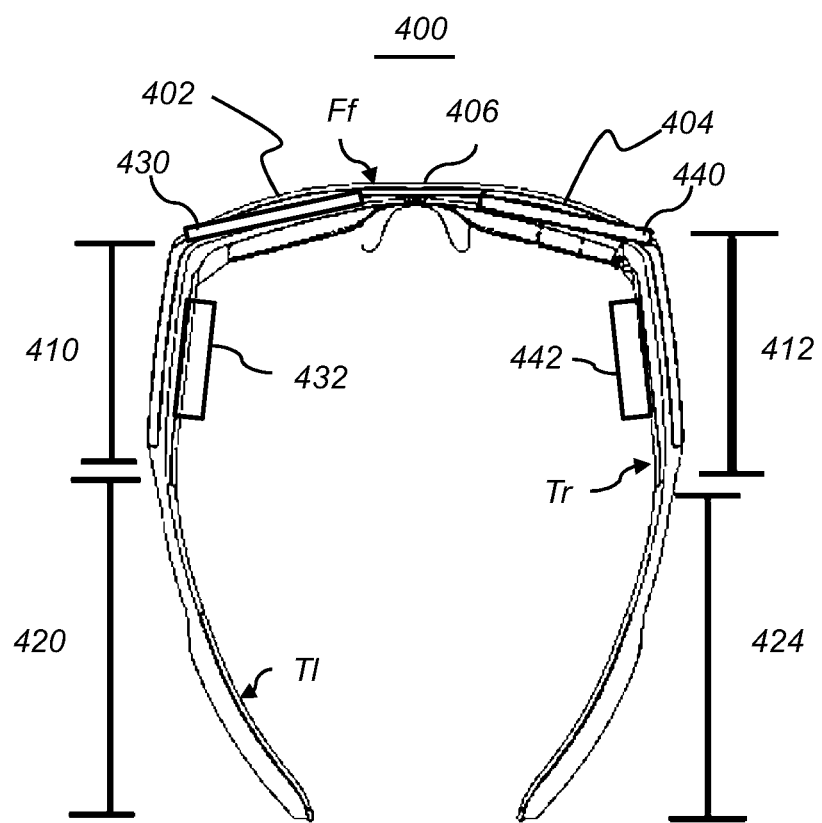

FIG. 7 is a top view of a HMD with a frame having rigid and flexible portions.

Figure 8:
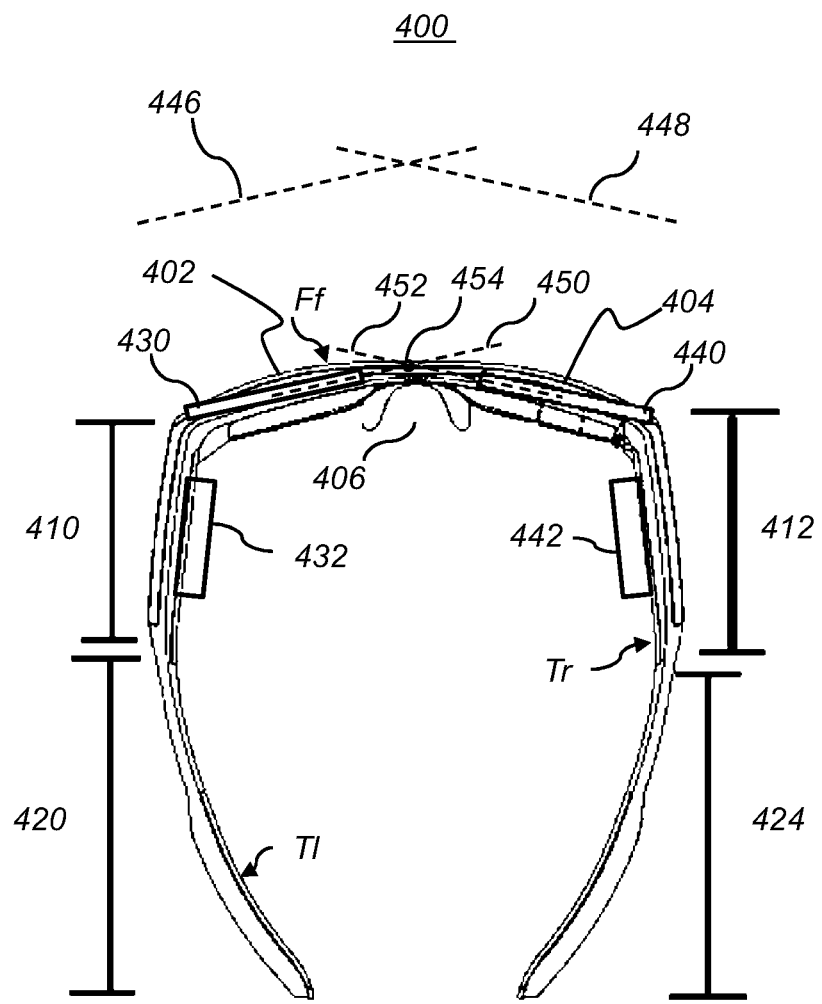

FIG. 8 is a top view of an AR/VR system showing the positioning of a flex rotation axis.

Figure 9:
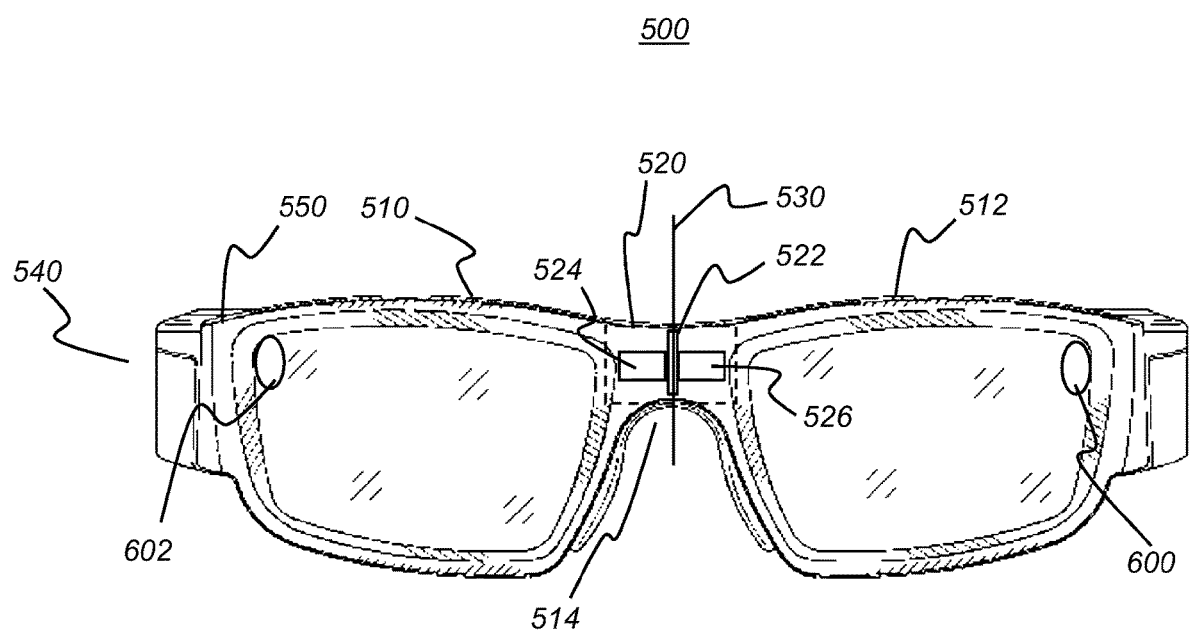

FIG. 9 is a front view of an AR/VR system with a flex rotation axis.

Figure 10:
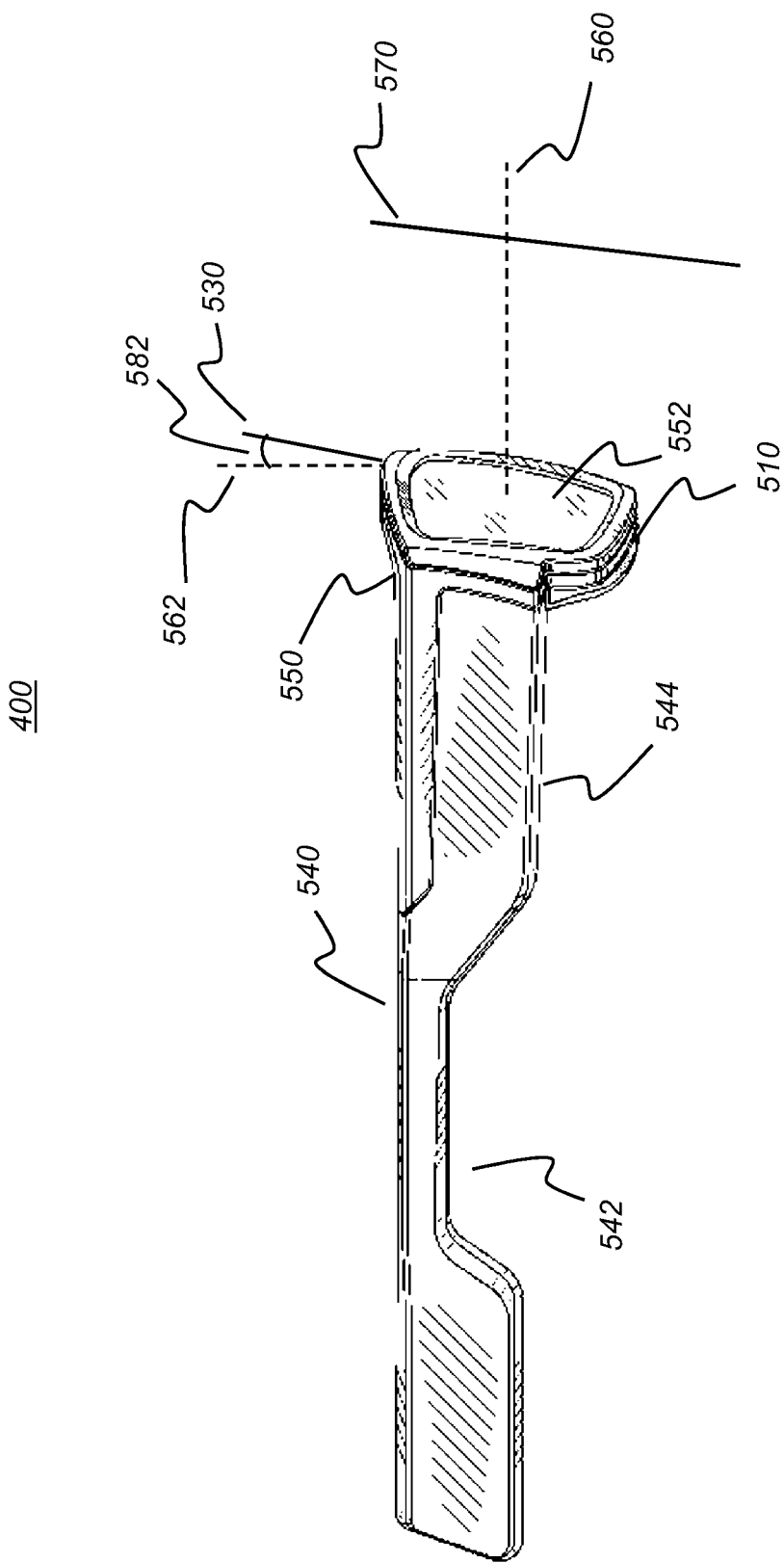

FIG. 10 is a side view illustrating the righthand side of an AR/VR system and the orientation of a flex rotation axis.

DETAILED DESCRIPTION

The present description is directed to various combinations of elements forming part of, or cooperating more directly with, apparatus in accordance with the present teaching. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise.

In the context of the present disclosure, the terms "viewer", "operator", and "user" are considered to be equivalent and refer to the person who wears and views images using the HMD viewing device.

The term "actuable" has its conventional meaning, relating to a device or component that is capable of effecting an action in response to a stimulus, such as in response to an electrical signal, for example.

The phrase "optical infinity" as used herein corresponds to conventional usage in the camera and imaging arts, indicating image formation using substantially collimated light, so that the focus distance exceeds at least about 4 meters.

In the context of the present disclosure, the term "coupled" is intended to indicate a physical association, connection, relation, or linking, between two or more components, such that the disposition of one component affects the spatial disposition of a component to which it is coupled. For mechanical coupling, two components need not be in direct contact, but can be linked through one or more intermediary components. A component for optical coupling allows light energy to be input to, or output from, an optical apparatus.

An "embedded" object or component here means that a portion of the object or component is within another object or component. It is not here used to imply that the object or component is completely covered by another object or component.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. Virtual image display has inherent advantages for augmented reality display. For example, the apparent size of a virtual image is not limited by the size or location of a display surface. In comparison with systems that project a real image, a more realistic viewing experience can be provided by forming a virtual image that appears to be some distance away. Providing a virtual image also obviates any need to compensate for screen artifacts, as may be necessary when projecting a real image.

Figure 1A:
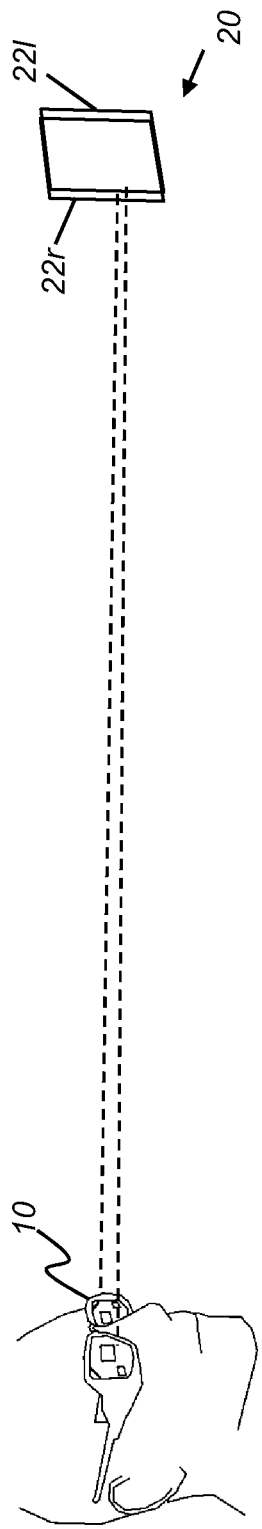
FIG. 1A is a schematic diagram of a head-mounted display (HMD) for forming a stereoscopic virtual image pair for a viewer.
Figure 1B:
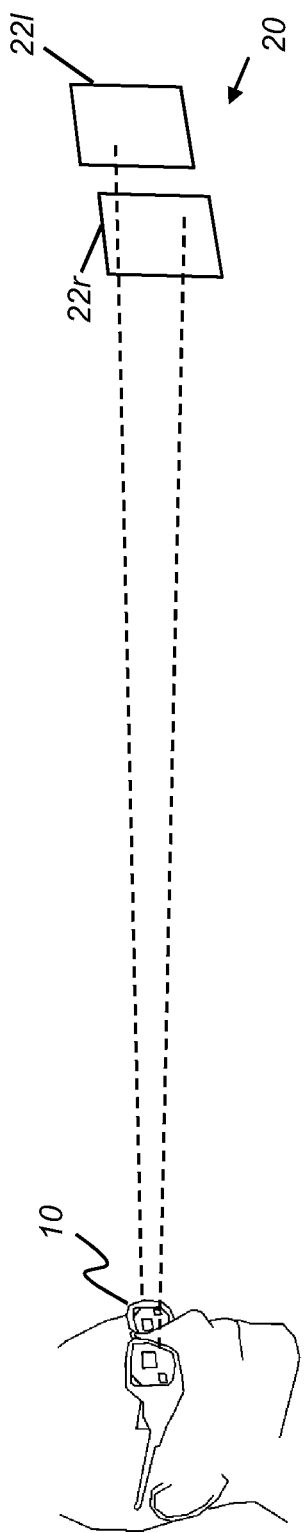
FIG. 1B is a schematic diagram of the HMD of FIG. 1A with right- and left-eye images misaligned.

FIGS. 1A and 1B show a head-mounted display HMD 10 for forming a stereoscopic virtual image pair 20 for a viewer. HMD 10 forms a left-eye virtual image 22*l* and a right-eye virtual image 22*r*, appropriately aligned with each other at a distance in front of the HMD 10 to provide the advantages of stereoscopic presentation. In FIG. 1A, left-eye image 22*l* and right-eye image 22*r* are represented as being aligned for stereoscopic imaging. In FIG. 1B, left-eye image 22*l* and right-eye image 22*r* are positioned out of horizontal alignment, as shown in exaggerated form.

The virtual images output from the HMD 10 comprise overlapping beams within which the virtual images are angularly encoded. Preferably, the beams corresponding to matching points within the left- and right-eye images 22*l* and 22*r* are aligned with each other or otherwise converge toward common points in the space in front of the HMD to support the desired stereoscopic presentation. Thus, the HMD 10 is preferably constructed to maintain the desired angular relationships between the left-eye image 22*l* and right-eye image 22*r*.

HMDs are preferably adjustable so that the HMDs can be comfortably and effectively worn by viewers with different head sizes or with other anatomical variations, including variations in interpupillary distance, that affect the way in which the wearable displays are optimally mountable on the viewers' heads. Embodiments of the present disclosure can accommodate the reshaping of HMDs for fitting different viewer head anatomies while preserving the desired stereoscopic presentation to each so-fitted viewer.

The top view schematics of FIGS. 2A, 2B, and 2C show changed positions of left- and right-eye virtual images corresponding to changes in the relative position of imaging components of head mounted display 10, such as changes due to flexure of an eyeglass frame F or other mounting apparatus. Head mounted display 10 has a left-eye imaging apparatus 12*l* and a right-eye imaging apparatus 12*r*. Each imaging apparatus 12*l*, 12*r* has image-forming optics, such as a corresponding lens L1*l* or L1*r* and a corresponding image generator 14*l* or 14*r*. Each image generator 14*l*, 14*r* is positioned at approximately focal length distance from its corresponding lens L1*l*, L1*r* for forming an infinity-focused virtual image 22*l*, 22*r* for the corresponding eye El or Er.

FIG. 2A shows forming the left- and right-eye virtual images 22*l* and 22*r* at an intended position for stereoscopic viewing. FIG. 2B shows angular shifting of images 22*l* and 22*r* due to flexure of frame F along a nose bridge 34. FIG. 2C shows a correction in the orientation of the images 22*l* and 22*r* to compensate for frame F flexure. The flexure of frame F shown in FIG. 2B corresponds to a flexure that might be used to adapt the frame F to fit a smaller head size with a result that the images 22*l* and 22*r* shift away from each other requiring a correction such as shown in FIG. 2C to preserve a desired stereoscopic presentation.

FIGS. 3A, 3B, and 3C show a HMD with a more complete frame F like a conventional eyeglass frame but depict the formation of just the right-eye image 22*r* for simplicity. The frame F has a frame front Ff and left and right temples Tl and Tr. A left-eye image is assumed to also be formed in a symmetric manner. The right-eye imaging apparatus includes an image generator in the form of a projector 32 mounted on the temple Tr and a plane-parallel waveguide 40 mounted on the frame front Ff. The projector 32 is oriented to direct angularly encoded image-bearing beams into the waveguide 40 along a nominal input direction represented by dashed arrow 26. The waveguide 40 conveys the image-bearing beams, such as by total internal reflection, to an output position in front of the right eye Er, where the image-bearing beams are directed out of the waveguide 40 and into the right eye Er along a nominal output direction represented by dashed arrow 28. Both the nominal input direction 26 and the nominal output direction 28 are shown aligned with a normal N of the waveguide 40, which also corresponds to the nominal orientation of the virtual image 22r. Other starting orientations of the nominal input and output directions 26 and 28 are possible but the alignments with the normal N provide a ready point of reference for comparison with the differing orientations of FIGS. 3B and 3C.

In FIG. 3B, the frame F is reshaped, e.g., bent, to fit a viewer with a smaller head size. The main effect of the flexure is a change in the orientation of the right temple Tr with respect to the frame front Ff. The direction of movement of the right temple Tr for fitting a smaller head size is indicated by arrow 36. With the projector 32 mounted on the right temple Tr, the indicated flexure changes the nominal input direction 26 along which the image-bearing beams from the projector 32 enter the waveguide 40. Due to the regular symmetries of the waveguide 40, the nominal output direction 28 along which the image-bearing beams exit the waveguide 40 shifts in an equal but opposite angular direction, whereby the projected virtual image 22r is moved inward with respect to the viewer field of view (FOV). Note that this is the opposite effect to that shown in FIG. 2B, where the entire imaging apparatus (e.g., the projector together with the waveguide) is pivoted about the nose bridge 34 to accommodate a smaller size viewer head. Thus, distributing flexures between the nose bridge 34 and temples Tl and Tr can be used to accommodate smaller head sizes while maintaining the desired alignments between the projected left and right virtual images 22l and 22r.

As FIG. 3C shows, the opposite movement of virtual image 22r happens when the temples such as the temple Tr, are bent in an opposite direction as shown by arrow 38 to accommodate a viewer with a larger head size. For example, the virtual image 22r is shown to move outward within the viewer field of view (FOV) in accordance with the change in the nominal input direction 26 that accompanies the relative outward pivotal movement of the projector 32 with the temple Tr in the direction of arrow 38.

Using either the HMD design of FIGS. 2A-2C or that of FIGS. 3A-3C, manual adjustment can be used to reposition components of left and right imaging apparatus 12l and 12r for correcting misalignments between the left- and right-eye virtual images 22l and 22r associated with viewer head-accommodating flexures of the HMD frames F. However, such manual adjustment can be time-consuming and the need for a manual adjustment procedure for each individual viewer can have a negative impact on the overall usability of a HMD. In response to the need to readily accommodate different viewers with the same HMD, an embodiment of the present disclosure provides an automated adjustment mechanism that measures flexure of the frame F and automatically computes and adjusts for left- and right-eye virtual image misalignments associated with the need to fit the different head sizes of viewers.

Referring to the top view schematic of FIGS. 4A and 4B, a HMD 50 is arranged to compensate for measured frame flexure and corresponding viewer head dimensions by changing the angular alignments of components in the left- and right-eye imaging apparatus 12l and 12r. In the HMD 50, flexure of frame F is sensed using a sensor 52, such as a strain gauge or other suitable position sensing device. The signal received from sensor 52, indicative of the amount of frame flexure and of the relative amount of corresponding image positioning adjustment needed for left- and right-eye image alignment, is processed by a control logic processor 54, such as a microcontroller. Output signals generated from processor 54 control one or both actuators 60 for adjusting the positions of one or more components within the left and right-eye imaging apparatus 12l and 12r. For example, this position adjustment can change the angular orientation of lens elements L1l and L1r. Alternatively, the adjustment can change the orientation or behavior of some other component in the imaging path, including a waveguide or projector, thereby suitably shifting the relative positions of the left- and right-eye virtual images 22l and 22r. Stereoscopic viewing can be corrected by moving just one of the left- and right-eye virtual images 22l and 22r, but preferably, both virtual images 22l and 22r are moved to maintain the stereoscopic image at a desired position (e.g., centered) within the field of view and to divide the required amount of correction between the components of the left and right-eye imaging apparatus 12l and 12r.

The sensor 52 can be a strain gauge that provides an output signal based on sensed flexure of the nose-piece section of frame F that lies between left- and right-eye imaging apparatus 12l, 12r. Alternative or additional sensors 56 can be used to sense deformations at the temples Tl and Tr or between the temples Tl and Tr and the frame front Ff. Control logic processor 54, in signal communication with sensors 56, converts the received signal to a digital input value and uses the values to determine a value for adjusting the angular orientation of the lenses L1l and L1r, such as from a pre-calculated or empirically derived look-up table (LUT).

An alternative to or in addition to such a mechanical adjustment of imaging components, the encoding of the virtual images within their angularly encoded beams can be adjusted within the image projection software. For example, images generated within the projectors can be relatively shifted before being converted into the angularly encoded beams output from the projector so that the resulting virtual images are relatively displaced within the viewer's FOV. Based on sensed information from one or more sensors 52, 56, control logic of processor 54 adjusts the image content to shift the relative left/right position of the virtual images 22l and 22r according to the sensed frame flexure. That is, pixels within the virtual images can be appropriately shifted left or right according to the sensed condition.

Various types of sensing and actuation devices can be used to provide signal output used for angular correction of one or more optical components or, alternately, control logic adjustment of the image data. Sensor types can include strain gauge sensors, rotation sensors, Hall effect sensors, limit switches, or other devices. Alternatively or additionally, the sensor 52 can be an operator control or switch, such as a thumbwheel switch, that senses a viewer adjustment for manual control of left/right image alignment.

The perspective view of FIG. 5 shows a binocular display system 100 for three-dimensional (3-D) augmented reality viewing. Display system 100 is shown as an HMD with left-eye imaging system 12l having a pupil expander 140l for the left eye and corresponding right-eye imaging system 12r having a pupil expander 140r for the right eye. The pupil expanders 140l and 140r expand areas of overlap between the angularly encoded image-bearing beams directed toward the viewer's eyes within which areas the intended virtual images can be seen. The pupil expanders 140l and 140r, which are preferably incorporated in the other embodiments, provide for accommodating variations in interpupillary distances among different viewers.

One or more image sources 152, such as a picoprojector or similar device, generate a separate image for each eye, formed as a virtual image with the needed image orientation for upright image display. One or more sensors 52 provide signals indicative of needed adjustment for alignment of left-eye and right-eye images. The images that are generated can be a stereoscopic pair of images for 3-D viewing. The virtual image that is formed by the optical system can appear to be superimposed or overlaid onto the real-world scene content seen by the viewer. Additional components familiar to those skilled in the augmented reality visualization arts, such as one or more cameras mounted on the frame of the HMD for viewing scene content or viewer gaze tracking, can also be provided.

FIGS. 6A and 6B are diagrams showing top sectional views of a HMD in the form of a flexible frame AR/VR (augmented reality or virtual reality) system 200. Flexible frame AR/VR system 200 comprises a flexible nose bridge 206 to which is attached left eye frame portion 202 and right eye frame portion 204. A left temple assembly 208 is rigidly attached to left eye frame portion 202 and a right temple assembly 210 is rigidly attached to right eye frame portion 204. Within flexible nose bridge 206 there is attached a support pin 220 that supports a support fixture 222. Support pin 220 and support fixture 222 do not move when flexible nose bridge 206 is flexed. Support fixture 222 supports a left exit window 224 and right exit window 226 of a left- and right-eye imaging apparatus and maintains the left exit window 224 and right exit window 226 in a fixed angular relationship to each other when flexible nose bridge 206 is flexed. Left eye frame portion 202 has a left cavity 228 into which left exit window 224 is disposed. Right eye frame portion 204 has a right cavity 230 into which right exit window 226 is disposed. The left and right cavities 228 and 230 accommodate flex of flexible nose bridge 206 without transferring any significant mechanical force, pressure, stress or strain onto left exit window 224 or right exit window 226. In this way, left and right eye frame portion 202 and 204 may move without changing the angular relations between left and right exit windows 224 and 226.

Flexible frame AR/VR system 200 further comprises a left imaging path with left optical components 236 coupled to left exit window 224 by left optical attachment element 232. Flexible frame AR/VR system 200 further comprises a right imaging path with right optical components 238 coupled to right exit window 226 by right optical attachment element 234. In one arrangement, one or both the left optical component 236 and the right optical component 238 are a prism. In another arrangement, one or both the left optical component 236 and the right optical component 238 are a composite prism or an assembly of multiple prisms. In another arrangement, one or both the left optical component 236 and the right optical component 238 are a prism have one or more prisms and one or more mirrors.

The left optical component 236 is optically and mechanically coupled to left projection system 244, and the right optical component 238 is optically and mechanically coupled to right projection system 246 along their respective imaging paths. A left channel 240 allows the left optical components 236 to extend into the left eye portion of frame 202, and a right channel 242 allows the right optical components 238 to extend into the right eye portion frame 204 such that flex motion of the left and right eye frames 202 and 204 does not impart significant force, pressure, stress or strain onto left and right optical components 236 and 238. The left and right projection systems 244 and 246 are disposed in left and right temple frame cavities 248 and 250, respectively, such that flex movement of the left and right temple assemblies do not impart any significant force, pressure, stress, or strain onto left or right projection systems 244 or 246 respectively. Because of this, relative positions of left and right-eye imaging apparatus are not changed as the flexible nose bridge 206 is flexed.

Flexible frame AR/VR system 200 further has left system components 252 and right system components 254 rigidly attach to the left temple assembly 208 and the right temple assembly 210, respectively, and therefore, move with the left and right temple assemblies 208 and 210 when these temple assemblies are bent (flexed) to accommodate a wider or narrower viewer head sizes in relation to a nominal viewer head size at which the left and right temple assemblies remain unflexed. The left and right system components 252 and 254 can include one or more of a battery, a circuit board, and a touch pad, as well as other components known to be associated with AR/VR systems.

FIGS. 6A and 6B further show a left frame surface normal 300 and a left exit window surface normal 302 as well as a right frame surface normal 304 and a right exit window surface normal 306. As shown in FIG. 6A, the left frame and left window normals 300 and 302 are aligned and the right frame and right window normals 304 and 306 are aligned when no external forces applied to bend the flexible nose bridge 206.

However, as shown in FIG. 6B, externally applied flex forces (shown as arrows at the left and right temple assembly portions 208 and 210) bend the flexible nose bridge 206. As a result, the left frame normal 300 is now seen to be inclined with respect to the left exit window normal 302. Similarly, the right frame normal 304 is inclined with respect to the right exit window normal 306. Because of the mechanically rigid connection of the support pin 220, the support fixture 222, the left and right exit windows 224, 226, the left and right optical components 236, 238, and the left and right projection systems 244, 246 together with the clearance provided by the left and right cavities 228, 230, the left and right channels 240, 242, and the left and right temple cavities 248, 250, the externally applied force bends the nose bridge 206 without changing the relative dispositions of the various optical components comprising the left-eye imaging apparatus and the right-eye imaging apparatus. The required clearance can be created in a variety of ways including fashioning the cavities as slots that permit relative motion of the frame with respect to the fixed optical components in the directions intended for flexure.

FIG. 7 is a top view of a HMD in the form of an AR/VR system 400 having a having a frame front Ff including a left exit window portion 402 and a right exit window portion 404 joined by a nose bridge 406. Each of the two temples Tl and Tr are divided into two portions distinguished by dimension lines. The left temple Tl includes a front temple portion 410 and a rear temple portion 420. The right temple Tr includes a front temple portion 412 and a rear temple portion 424. The AR/VR system 400 also includes a left-eye imaging apparatus and a right-eye imaging apparatus. The left-eye imaging apparatus includes a waveguide 430 fixed within the left exit window portion 402 and a projector 432 fixed to the front temple portion 410. Similarly, the right-eye imaging apparatus includes a waveguide 440 fixed within the right exit window portion 404 and a projector 442 fixed to the front temple portion 412.

The frame front, including the left exit window portion 402, the right exit window portion 404, and the nose bridge 406, and the front portions 410 and 412 of the left and right temples Tl and Tr form a rigid structure for maintaining proper alignments between the left-eye imaging apparatus and the right-eye imaging apparatus for supporting stereoscopic presentations. A rigid nose piece 406, together with rigid connections between the nose piece 406 and both the left exit window portion 402 and the right exit window portion 404, maintains a fixed angular relationship between the two waveguides 430 and 440. A rigid connection between the left exit window portion 402 and the front portion 410 of the left temple Tl maintains a fixed angular relationship between the waveguide 430 and the projector 432. Similarly, a rigid connection between the right exit window portion 404 and the front portion 412 of the right temple Tr maintains a fixed angular relationship between the waveguide 440 and the projector 442.

Unlike the front portions of the frame, the rear temple portions 420 and 424 are flexible with respect to the front temple portions 410 and 412 to accommodate different viewer head widths. For example, the rear temple portions 420 and 424 can be fabricated from one or more flexible elastic materials, having elastic memory, that when laterally displaced spring back to a nominal position when no external forces are applied to the rear temple portions 420 and 424. Alternatively, the left and right the rear temple portions 420 and 424 can be respectively connected to the left and right front temple portions 410 and 412 with spring-loaded or elastomeric hinges. The left and right the rear temple portions 420 and 424 could also be subdivided into flexibly interconnected sections. Regardless of the mode of flexibility whereby the rear temple portions 420 and 424 are urged against viewers' heads of different widths, the flexibility and variable dispositions of the rear temple portions 420 and 424 do not affect the alignments between the left-eye imaging apparatus and the right-eye imaging apparatus for supporting stereoscopic presentations.

FIG. 8 is a top view of AR/VR system 400 showing the positioning of a flexible hinge rotation axis 454 in the nose bridge 406 region of AR/VR system 400. The left fixed exit window portion 402 and right fixed exit window portion 404 are constructed and joined together in the nose bridge 406 region such that they can rotate about the hinge rotation axis 454 but no other axis. Such rotation about the hinge rotation axis 454 may be used to compensate for the various head sizes of different wearers of the AR/VR system 400. Flex rotation (rotation of each left, right half of AR/VR system 400 in opposite directions) about the hinge rotation axis 454 rotates the left fixed exit window portion 402 and the right fixed exit window portion 404 that are rigidly attached to the left fixed frame portion 410 and the right fixed frame portion 412, respectively, in opposite directions. The nose bridge 406, together with embedded hinge assembly (not shown, but see 520 of FIG. 9) is constructed to prevent twist and/or torque motion between the left fixed exit window portion 402 and the right fixed exit window portion 404 about any axis except the axis defined by the hinge rotation axis 454. Such flex rotation shifts the left virtual image plane 446 and the right virtual image plane 448 left or right. These shifts of virtual image planes can be compensated for in software that generates the images to be displayed through left planar waveguide 430 and right planar waveguide 440.

Hinge rotation axis 454 may be defined by the intersection of two planes to form a line, the line being the hinge rotation axis 454. The first plane is left plane 450 parallel to the left virtual image plane 446 and the second plane is right plane 452 parallel to the right virtual image plane 448 such that the intersection of left plane 450 and right plane 452 defines a line running through the nose bridge 406 region of AR/VR system 400. The left virtual image plane 446 is generated by the left planar waveguide 430 and the right virtual image plane is generated by the right planar waveguide 440. The left virtual image plane 446 may not be parallel to the left planar waveguide 430, and right virtual image plane 448 may not be parallel to the right planar waveguide 440.

FIG. 9 is a front view of an AR/VR system 500 having a right exit window frame 510, a left exit window frame 512 and a nose bridge 514. Embedded within the right exit window frame 510 is a planar waveguide (not shown but see 440 of FIG. 8) and embedded within the left exit window frame 512 is a planar waveguide (not shown but see 430 of FIG. 8). Embedded hinge assembly 520 is disposed within nose bridge 514 and is further mechanically connected to right exit window frame 510 and mechanically connected to left exit window frame 512 such that the right exit window frame 510 and the left exit window frame 512 can pivot about the hinge rotation axis 530 thus rotating the embedded planar waveguides (not shown) about the hinge pin rotation axis 530. The hinge rotation axis 530 has been defined in FIG. 8 as hinge rotation axis 454. In this way, the embedded planar waveguides (see 430, 440 of FIG. 8) are also rotated about hinge rotation axis 530.

Embedded hinge assembly 520 may consist of a mechanical pin 522, left tab 526 and right tab 524 such that the left tab 526 and right tab 524 may rotate about mechanical pin 522. Mechanical pin 522 is positioned and aligned along hinge pin rotation axis 530 (which is the same as hinge rotation axis 454 of FIG. 8). Embedded hinge assembly 520 may consist of right tab 524 and a left tab 526. Right tab 524 may have a cylinder-shaped edge (not shown) and an essentially flat tab section (not shown). Left tab 526 may have a receptacle groove edge (not shown) and an essentially flat tab section (not shown). The cylinder-shaped edge of right tab 524 may slide into receptacle groove edge of left tab 526 to form hinge assembly 520. Cylinder shaped edge of right tab 524 is aligned along hinge pin rotation axis 530. Cylinder shaped edge of right tab 524 may be magnetic. Receptacle edge groove edge of left tab 526 may be magnetic and/or composed of a material that is magnetizable. Hinge assembly 520 may be constructed in two halves that can be repeatably joined and separated by the wearer of AR/VR system 500. Hinge assembly 520 may be constructed in at least two part (right and left parts) such that right part is a continuous part of right exit window frame 510 and left part is a continuous part of left exit window frame 512. As is known to those skilled in the art, there are other ways to construct a hinge like mechanism suitable for allowing right exit window frame 510 and left exit window frame 512 to rotate, in opposite rotation directions, about hinge pin rotation axis 530 and no other axis while preventing twists between left exit window frame 512 and right exit window frame 510.

FIG. 10 is a side view illustrating the righthand side of AR/VR system 500 comprising at least a right exit window frame 510, a right exit window 552, embedded right planar waveguide (not shown, but see 440 of FIG. 8) and a right temple frame 540. Right temple frame 540 further comprises a right fixed temple frame 544 portion and a right rear frame 542 portion. Right rear frame 542 may be constructed from known flexible material. Right rear frame 542 may be constructed into individual connected sections, one or more sections may be able to flex while other sections may be rigid. Right temple frame 540 is rigidly connected to right exit window frame 510 by rigid frame connection 550.

FIG. 10 further illustrates the relative orientation of hinge pin rotation axis 530. Vertical line 562 and horizontal line 560 are orthogonal to one another and are used for descriptive orientation purposes only. Horizontal line 560 may not be perpendicular to line 570 formed by the intersection of left virtual image plane and right virtual image plane. As shown, the hinge pin rotation axis 530 is parallel to line 570 and is at a tilt angle 582 to the vertical line 562. Tilt angle 582 may be an angle within the angular range 5 to 10 degrees. Tilt angle 582 may be within the angular range of 0 to 15 degrees. Tile angle may be within the angular range of −15 to +15 degrees.

FIG. 10 is illustrative of the right half of the AR/VR system 500. It is to be understood that similar construction and quantities are to be applied to the left half of the AR/VR system 500, with mirror symmetry.

The flex of the AR/VR system 500, due to the constraints caused by the construction of the embedded hinge assembly 520, permits the right and left frame halves of the AR/VR system 500 to be rotated about the hinge pin rotation axis 530 in opposite rotation directions to accommodate different wearer's head sizes.

The angular amount that the embedded planar waveguide (not shown but see 430 of FIG. 8) within left exit window frame 512 and the embedded planar waveguide (not shown but see 440 of FIG. 8) within right exit window frame 510 are rotated about hinge pin rotation axis 530 can be determined in several different ways. One way is to include an electronic sensor element within hinge assembly 520 of FIG. 9 that can sense the angular amount of rotation about the hinge pin rotation axis 530. (See sensor 52 in FIG. 4A and FIG. 4B.) Another way to determine the angular rotation of the embedded waveguides is by utilization of a forward looking camera 602 of FIG. 9 embedded, for example, in the right half of the AR/VR system 500, and a forward looking distance sensor 600 of FIG. 9 embedded within the left half of the AR/VR system 500 such that the camera 602 and distance sensor 600 are rotated with the rotation of the embedded waveguides about the hinge pin rotation axis 530. The camera 602 may provide the angular orientation to a distant object placed in front of the AR/VR system 500 relative to the camera's vector normal direction, while the distance sensor 600 may provide the angular orientation to the same object with respect to the vector normal of the distance sensor as well as the distance to the object. With these three measurements, and the known construction of the AR/VR system 500, including camera 602 and distance sensor 600 locations within AR/VR system 500, the angular orientation of the left and right embedded waveguides about the hinge pin rotation axis 530 can be determined. Once the angular rotation amount about the hinge pin rotation axis 530 is determined, the angular rotation amount may be utilized by software such that the left and right virtual images may be shifted horizontally by the software generating the left and right virtual images to compensate for the planar waveguides relative orientation to one another, providing a 3-dimensional virtual image to the wearer of AR/VR system 500.

Alternatively, the relative rotation of the fixed exit window portions 402 and 404 can take place about the hinge rotation axis 454 (or 530) independently of the waveguides 430 and 440 and their relative orientations to the respective projectors 432 and 442 such as shown in the system 200 in FIGS. 6A and 6B for accommodating different anatomies without changing the angular relations between the left virtual image plane 446 and the right virtual image plane 448. The amount that the fixed exit window portions 402 and 404 can be pivoted independently of the waveguides 430 and 440 can be limited to preserve the angular relations between the left virtual image plane 446 and the right virtual image plane 448 for small adjustments but to vary he angular relations between the left virtual image plane 446 and the right virtual image plane 448 for larger adjustments.

The description highlights presently preferred embodiments, but it will be understood that variations and modifications can be effected within the spirit and scope of the overall teaching. The presently disclosed embodiments are therefore considered in all respects to be illustrative and not restrictive, and all changes that come within the meaning and range of equivalents thereof are intended to be embraced therein.

The invention claimed is:

1. An imaging apparatus for stereoscopic viewing, comprising:
a frame operable to be reshaped from a first shape to a second shape;
a left-eye imaging apparatus supported by the frame, wherein the left-eye imaging apparatus comprises a first projector and a first waveguide;
a right-eye imaging apparatus supported by the frame, wherein the right-eye imaging apparatus comprises a second projector and a second waveguide;
wherein the left-eye imaging apparatus and the right-eye imaging apparatus have a first relative alignment operable to convey stereoscopic virtual images to a viewer when the frame is in the first shape,
wherein the left-eye imaging apparatus and the right-eye imaging apparatus are arranged at a second relative alignment when the frame is in the second shape; and
an adjustment mechanism comprising an actuator operable to respond to a reshaping of the frame, wherein the actuator is operable to change an angular alignment of the first projector relative to the first waveguide and the frame and/or the second projector relative to the second waveguide and the frame to restore the first relative alignment of the left-eye imaging apparatus and the right-eye imaging apparatus while the frame is in the second shape.

2. The apparatus of claim 1, further comprising at least one sensor coupled with the frame and operable to provide an output signal indicative of the changes to a relative alignment of the left-eye imaging apparatus and the right-eye imaging apparatus between the first relative alignment and the second relative alignment.

3. The apparatus of claim 2, wherein the actuator is operable to respond to the output signal of the at least one sensor, wherein the actuator is operable to adjust a relative angular disposition of one or more components of the left-eye imaging apparatus and the right-eye imaging apparatus.

4. The apparatus of claim 3, wherein the at least one sensor measures flexure at a nose bridge of the frame.

5. The apparatus of claim 3, wherein the frame comprises a left temple and a right temple, and the at least one sensor is operable to measure flexure at one or both temples.

6. The apparatus of claim 3, wherein the at least one sensor is a strain gauge.

7. The apparatus of claim 3, wherein the at least one sensor is an operator control.

8. The apparatus of claim 3, wherein the first and second waveguides are operable to convey the virtual image to the corresponding left and right eye of the viewer.

9. The apparatus of claim 8, wherein the actuator is operable to adjust a relative angular disposition of the first and second waveguide relative to the frame.

10. The apparatus of claim 2, further comprising at least one image generator, wherein the adjustment mechanism is operable to relatively shift left-eye image content and right-eye image content produced by the at least one image generator in response to the output signal of the at least one sensor.

11. An imaging apparatus for stereoscopic viewing, comprising:
   a flexible frame operable to be reshaped from a first shape to a second shape;
   a left-eye imaging apparatus including a left projection system and a left waveguide; and
   a right-eye imaging apparatus including a right projection system and a right waveguide;
   wherein the left-eye imaging apparatus and the right-eye imaging apparatus have a relative alignment operable to convey stereoscopic virtual images to the viewer when the frame is in the first shape;
   the left-eye imaging apparatus and the right-eye imaging apparatus being rigidly coupled to each other within the frame, wherein the frame is operable to flex relative to the left-eye imaging apparatus and the right-eye imaging apparatus; and
   wherein the left-eye imaging apparatus and the right-eye imaging apparatus maintain the relative alignment when the frame is in the second shape.

12. The apparatus of claim 11, wherein the flexible frame includes a flexible nose bridge located between the left-eye imaging apparatus and the right-eye imaging apparatus.

13. The apparatus of claim 12, wherein the left-eye imaging apparatus and the right-eye imaging apparatus are connected to the frame through a pin in the flexible nose bridge.

14. The apparatus of claim 11, wherein the flexible frame includes cavities within which the left-eye imaging apparatus and the right-eye imaging apparatus are relatively movable with respect to the frame.

15. A near-eye binocular imaging system, comprising:
   at least one image generator operable to generate angularly encoded image-bearing beams;
   a frame configured to be worn by a viewer, wherein the frame is operable to be reshaped from a first shape to a second shape;
   a left-eye imaging apparatus comprising a first waveguide supported by the frame, wherein the left-eye imaging apparatus is operable to convey at least a portion of the image-bearing beams to a left eye of the viewer;
   a right-eye imaging apparatus comprising a second waveguide supported by the frame, wherein the right-eye imaging apparatus is operable to convey at least a portion of the image-bearing beams to a right eye of the viewer;
   wherein the left-eye imaging apparatus and the right-eye imaging apparatus have a first relative alignment operable to convey stereoscopic virtual images to the viewer when the frame is in the first shape;
   wherein the left-eye imaging apparatus and the right-eye imaging apparatus are arranged at a second relative alignment when the frame is in the second shape;
   a sensor supported by the frame, wherein the sensor is operable to detect the change in the relative orientation of the left-eye imaging apparatus and the right-eye imaging apparatus; and
   a processor associated with the at least one image generator, wherein the processor is operable to receive an output from the sensor and determine an amount of adjustment operable to compensate for the changes to the relative orientation of the left-eye imaging apparatus and the right-eye imaging apparatus, and
   wherein the processor is operable to adjust the angular encoding of the image-bearing beams to at least partially restore the relative alignment of the stereoscopic virtual images viewable by the left and right eyes of the viewer while the frame is in the second shape.

16. The near-eye binocular imaging system of claim 15, wherein the at least one image generator comprises a first projector supported by the frame, wherein the first projector is operable to project the angularly encoded image-bearing beams into the first waveguide, and wherein the first waveguide is operable to convey at least a portion of the angularly encoded image-bearing beams to the viewer's left eye.

17. The near-eye binocular imaging system of claim 16, wherein the at least one image generator comprises a second projector supported by the frame; and wherein the second projector is operable to project the angularly encoded image-bearing beams into the second waveguide, and wherein the second waveguide is operable to convey at least a portion of the angularly encoded image-bearing beams to the viewer's right eye.

18. The near-eye binocular imaging system of claim 17, wherein the processor is operable to adjust the angular encoding of the image-bearing beams of at least one of the first and second projectors to convey stereoscopic virtual images to the viewer.

19. The near-eye binocular imaging system of claim 18, wherein the frame is subject to flexure to accommodate different viewer head anatomies and the sensor is operable to measure the flexure of the frame.

20. The near-eye binocular imaging system of claim 19, wherein the sensor includes at least one of a camera and a distance sensor mounted on the frame operable to measure the flexure of the frame.

21. The near-eye binocular imaging system of claim 19, wherein the frame includes a frame front supporting the first and second waveguides, and temples supporting the first and second projectors.

22. The near-eye binocular imaging system of claim 21, wherein the frame front includes a nose-piece section between the first and second waveguides, and the sensor is operable to detect flexure of the nose-piece section.

23. The near-eye binocular imaging system of claim 21, wherein the sensor is one of at least two sensors operable to detect changes in the orientation of the temples with respect to the frame front.

24. The near-eye binocular imaging system of claim 15, further comprising an adjustment mechanism operable to respond to the reshaping of the frame, wherein the adjustment mechanism is operable to change an angular alignment of the first waveguide and/or the second waveguide relative to the at least one image generator and to the frame, wherein the processor is operable to output a signal to the adjustment mechanism to change the angular alignment of the first waveguide and/or the second waveguide to at least partially restore relative alignment of the left-eye imaging apparatus and the right-eye imaging apparatus while the frame is in the second shape.

25. A method of accommodating flexure of a frame that supports a left-eye imaging apparatus and a right-eye imaging apparatus within which angularly encoded image-bearing beams generated by at least one image generator are conveyed to the left and right eyes of a viewer, comprising:
   relatively orienting the left-eye imaging apparatus and the right-eye imaging apparatus for relatively aligning virtual images viewable by the left and right eyes of the viewer to convey stereoscopic virtual images to the viewer when the frame is in a first shape;

reshaping the frame whereby a relative orientation of the left-eye imaging apparatus and the right-eye imaging apparatus is operable to change to accommodate different viewer head anatomies while correspondingly misaligning the virtual images viewable by the left and right eyes of the viewer, wherein the frame is in a second shape;

sensing the reshaping of the frame as an indication of the change in the relative orientation of the left-eye imaging apparatus and the right-eye imaging apparatus;

determining from the sensed reshaping of the frame an amount of adjustment to compensate for the changes to the relative orientation of the left-eye imaging apparatus and the right-eye imaging apparatus while the frame is in the second shape; and adjusting the angular encoding of the image-bearing beams that are generated by the at least one image generator in accordance with the determined amount of adjustment to at least partially restore the relative alignment of the stereoscopic virtual images while the frame is in the second shape.

26. The method of claim 25, wherein the step of reshaping includes bending a nose-piece portion of the frame between the left-eye and right-eye imaging apparatus and the step of sensing detects the bending of the nose-piece section.

27. The method of claim 25, wherein the at least one image generator includes a first image generator operable to generate angularly encoded image-bearing beams directed to the left-eye imaging apparatus, and a second image generator operable to generate angularly encoded image-bearing beams directed to the right-eye imaging apparatus, and the step of adjusting the angular encoding of the image-bearing beams includes adjusting the angular encoding of the image-bearing beams generated by the first and second image generators in opposite directions.

* * * * *